United States Patent [19]

Humble et al.

[11] 4,103,572

[45] Aug. 1, 1978

[54] UNLATCHING TOOL FOR REUSABLE SECURITY TAG

[75] Inventors: David Raymond Humble, Plantation, Fla.; Harry Godfrey Walters, III, Lancaster, Pa.

[73] Assignee: Sensormatic Electronics Corporation, Hollywood, Fla.

[21] Appl. No.: 599,081

[22] Filed: Jul. 25, 1975

Related U.S. Application Data

[62] Division of Ser. No. 428,827, Dec. 27, 1973, Pat. No. 3,942,829.

[51] Int. Cl.[2] .......................... B23P 19/04; B25B 7/02

[52] U.S. Cl. ....................................... 81/418; 29/268; 81/5.1 R

[58] Field of Search ............ 81/418, 419, 420, 425 R, 81/426, 5.1 R; 29/200 H, 268, 200 P

[56] References Cited

U.S. PATENT DOCUMENTS

| | | | |
|---|---|---|---|
| 1,923,199 | 8/1933 | Hackney | 81/5.1 |
| 2,405,779 | 8/1946 | Davis | 81/418 |
| 3,827,125 | 8/1974 | Matthews | 29/200 H |

*Primary Examiner*—James L. Jones, Jr.
*Assistant Examiner*—Roscoe V. Parker
*Attorney, Agent, or Firm*—Watson, Leavenworth, Kelton & Taggart

[57] ABSTRACT

A reusable security tag has an enclosure containing an element detectable by independent means and a cruciate sheet metal clutch lock. A pin for piercing a garment is secured at the end of a lever arm which is hinged to said enclosure for controlled movement into said clutch lock. Said pin is released from said clutch lock by application of a special tool to said enclosure for deforming said clutch lock to spread its jaws. Elliptical grooves around the shank of said pin increase the retentivity of said clutch lock without decreasing unnecessarily the tensile strength of said shank.

1 Claim, 27 Drawing Figures

Fig. 14.
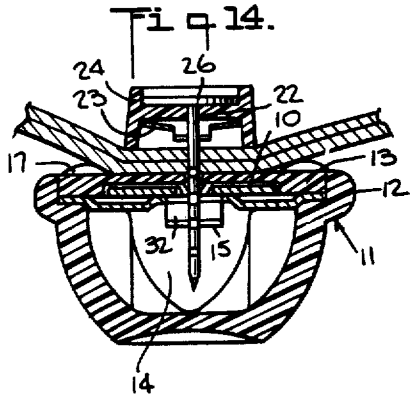
Fig. 13.
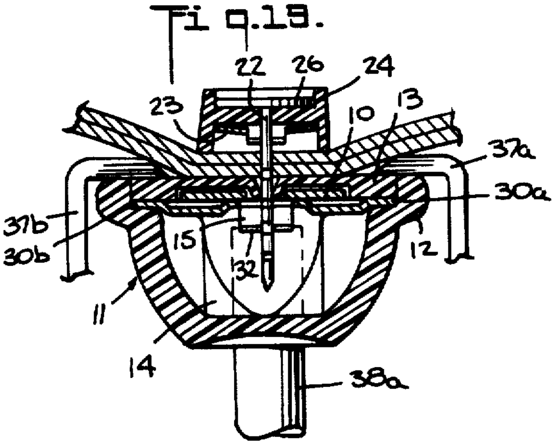
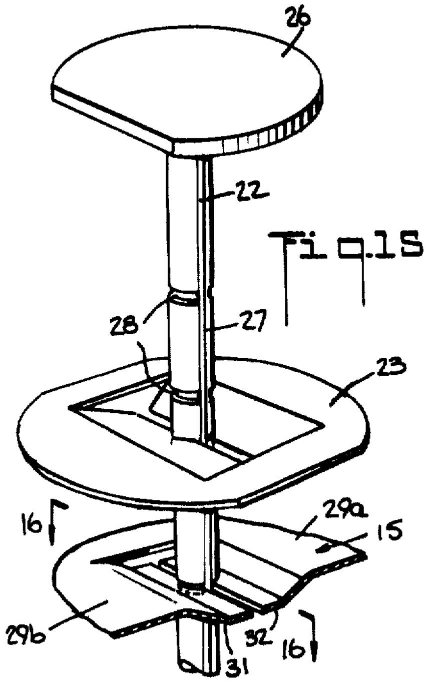
Fig. 15.
Fig. 16.
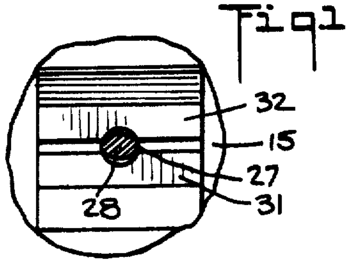
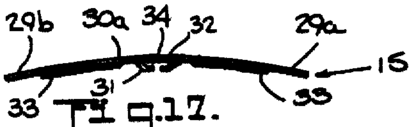
Fig. 17.
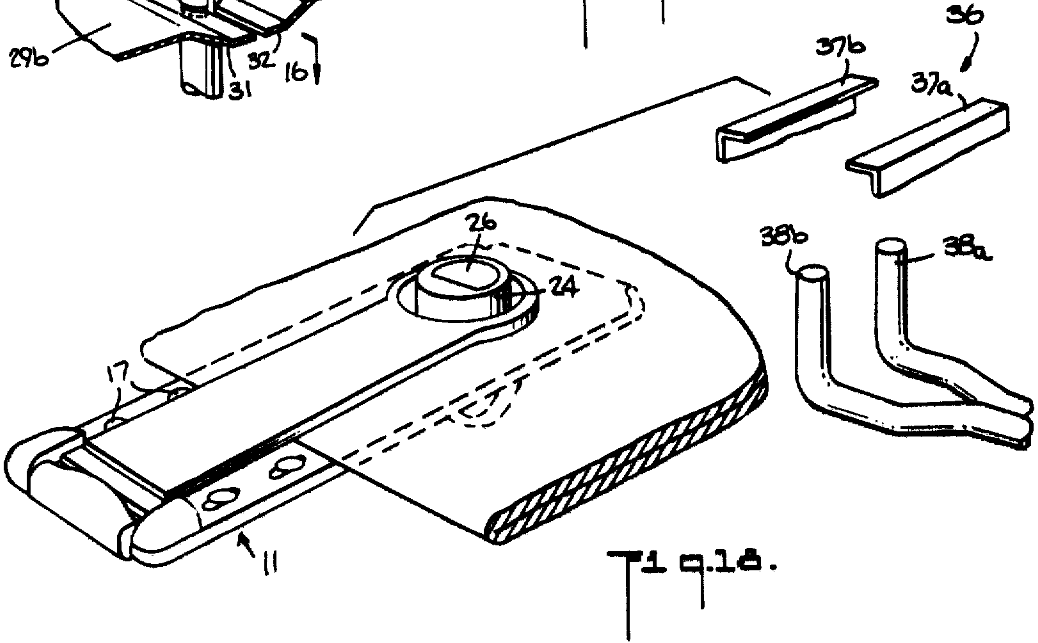
Fig. 18.

UNLATCHING TOOL FOR REUSABLE SECURITY TAG

This is a division of application Ser. No. 428,827, now U.S. Pat. No. 3,942,829 filed Dec. 27, 1973.

DISCLOSURE

The present invention relates to a reusable security tag adapted to be secured to an article to be maintained under surveillance, and more particularly to a tag concealing an element detectable by independent means.

In the copending patent application of John Welsh et al., Ser. No. 157,618 filed June 28, 1971, for "Article Surveillance", there is disclosed inter alia a system for maintaining secruity through a surveillance zone by establishing throughout said zone an interrogating radio wave field and affixing tags to articles under surveillance which are adapted to reradiate a discernible and distinguishable radio wave signal when passing through said zone. As described in said application, the active portion of the tag may take the form of a simple nonlinear impedance, e.g., a semiconductor diode, directly coupled to antenna elements. Such surveillance system is particularly useful when employed for cntrolling theft from retail stores or the like.

The present invention provides a reusable tag for securing a reradiating element, such as that disclosed in said copending applicaton, to an article to be maintained under surveillance. In particular, there is provided by the present invention a tag adapted to be secured to the fabric of a garment or to other material through which a pin can be passed.

It will be understood that for such system to operate satisfactorily, the tags containing the detectable elements must be easily attachable to the garment or article yet not readily removed by unauthorized hands. On the other hand, the retail clerk must have a simple convenient means for readily removing tags from garments which, due to purchase or other reasons, may be removed legitimately from the premises.

It is, therefore, an object of the present invention to provide a reusable security tag of the aforesaid type which is easily secured to a garment or the like and nonremovable except through the use of authorized nondestructive release means.

In accordance with an aspect of the present invenion there is provided such a reusable tag which comprises a pin having a first end adapted to be urged through a portion of an article to be protected. The opposite end of the pin is provided with means for preventing said pin from passing through the article. Clutch lock means are provided for accepting facile insertion of said first end of the pin therein after the latter has passed through said article but resisting removal of an inserted pin. An enclosure for concealing said lock means is provided along with means for concealing a detectable element joined to at least one of said pin and said enclosure with said enclosure being constructed and arranged for permitting authorized nondestructive release of said pin from said lock means.

In accordance with a further aspect of the present invention here is provided an unlatching tool for a reusable security tag of the aforesaid type comprising a pair of confronting jaws arranged to straddle said tag with a close fit, each jaw having an inwardly directed lip for overlying and engaging a given surface of said tag to prevent movement of saig tag from between said jaws in a direction past said lips, and a pair of spaced apart fingers mounted for movement relative to said jaws for engaging another surface of said tag situated opposite said given surface to apply pressure to said tag against the restraint of said jaw lips.

The invention will be better understood after reading the following detailed description of a presently preferred embodiment thereof with reference to he appended drawings in which:

FIG. 14 is a transverse sectional view taken along line 14—14 of FIG. 11;

FIG. 15 is an enlarged view of the pin, clutch lock and retaining member;

FIG. 16 is a transverse view taken along line 16—16 of FIG. 15;

FIG. 17 is a side view of the clutch lock member;

FIG. 18 is an exploded view of the principal elements of a release tool about to be applied to a tag secured to a garment;

FIG. 19 is a view similar to FIg. 14 showing the tool of FIG. 18 in place;

Figures 23, 24, 25, 26:
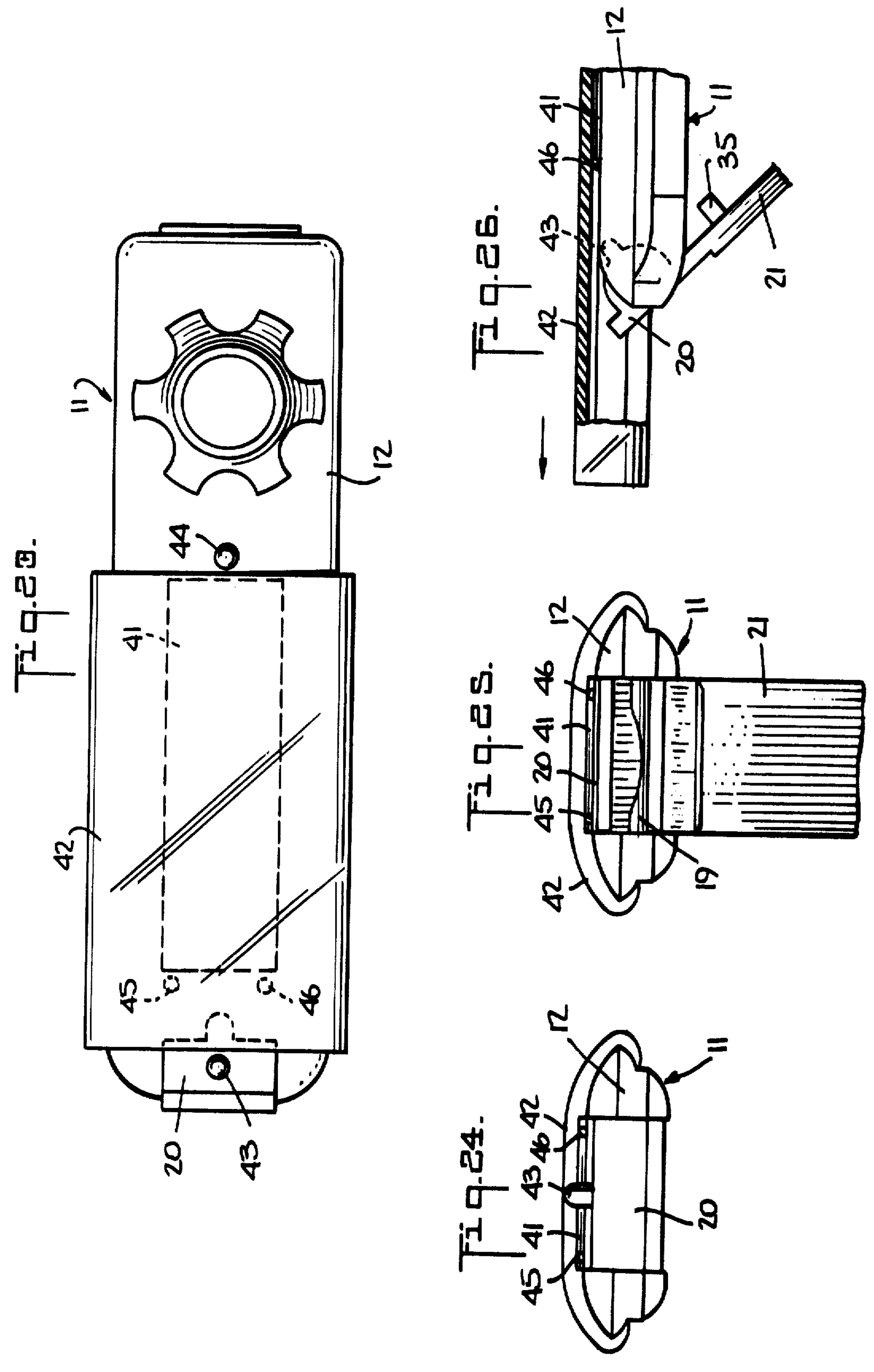
FIG. 23 is a fragmentary top plan view similar to FIG. 6 showing a transparent sleeve locked onto the tag securing thereto a replaceable intelligence bearing element.
FIG. 24 is an end elevational view of the left side of the tag shown in FIG. 23.
FIG. 25 is a view similar to FIG. 24 but with the lever of the tag in partially opened position.
Figure 20:
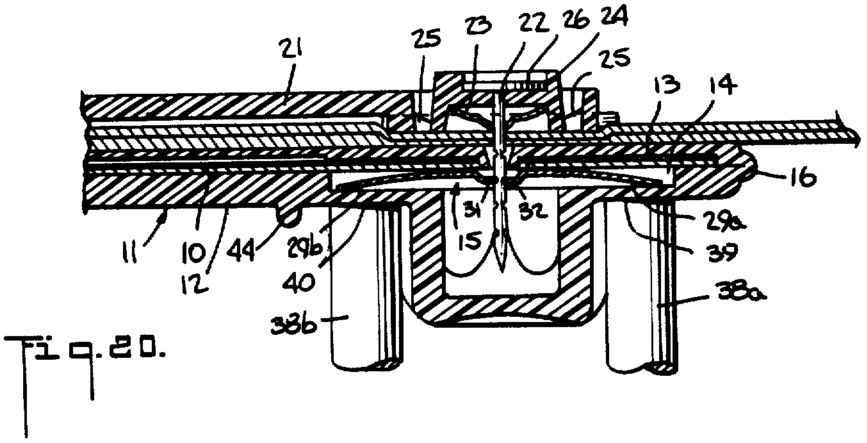
FIG. 20 is a view similar to FIG. 11 showing the tool of FIG. 18 in place.
Figure 21:
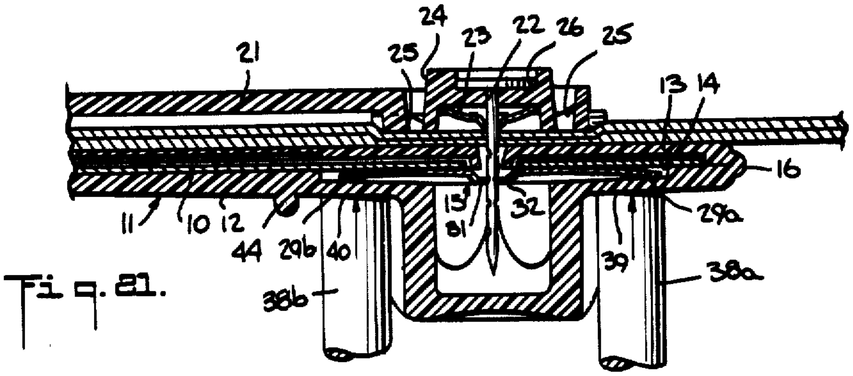
FIG. 21 is a view similar to FIG. 20 with release force applied.
Figure 22:
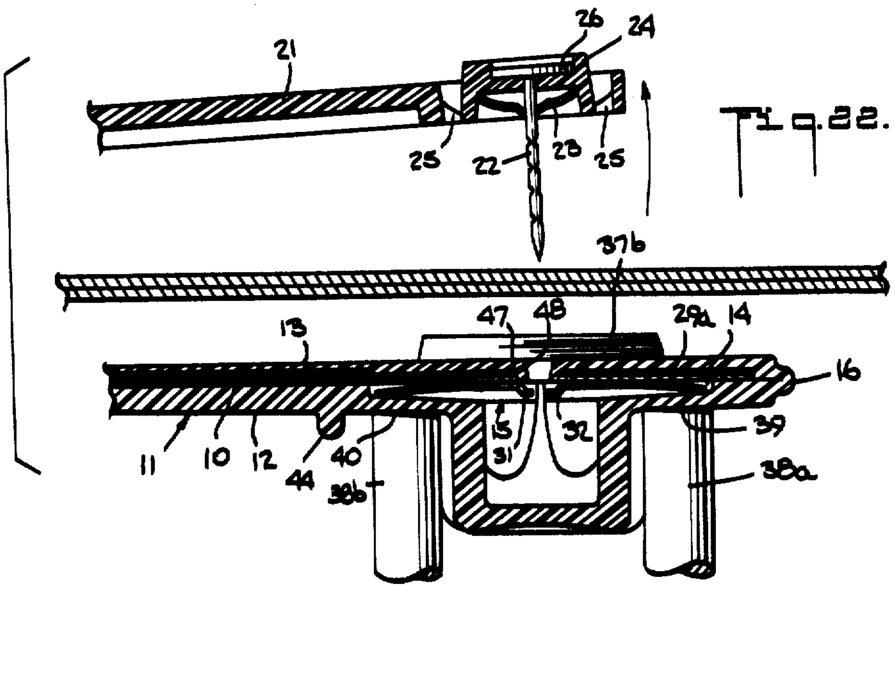
FIG. 22 is a view similar to FIG. 21 with the pin released.
Figure 27:
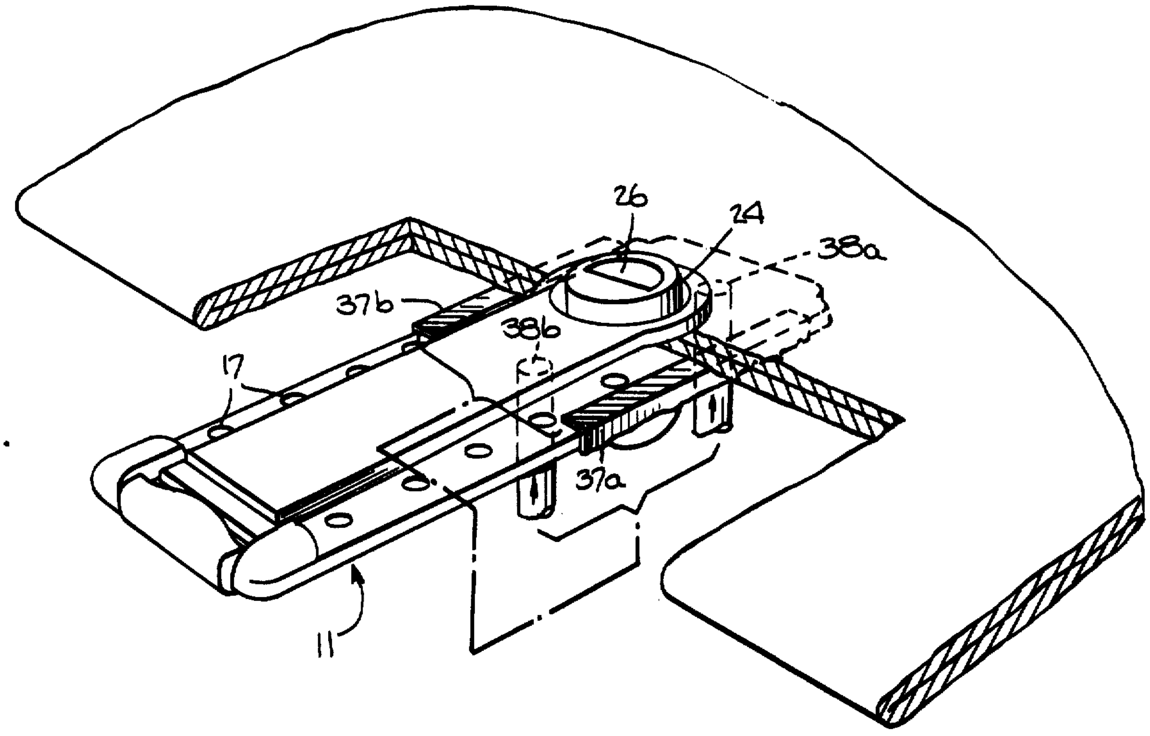

FIG. 26 is a view of the right side of the tag shown in FIG. 25 with a portion of the sleeve broken away; and FIG. 27 is a view similar to FIG.. 18, but with the principal elements of the release tool in operative position relative to the tag and with a portion of the garment broken away for clarity. The same reference numerals are used throughout the appended drawings to designate the same or similar parts.

Referring now to the drawings, the detectable element is designated generally by the reference character 10 and may take the form of a thin elongated laminated structure containing a suitable sensor emitter circuit, not shown. The details of such circuit do not form a part of the present invention and, therefore, are not described herein. Reference may be had to the aforesaid copending application for description of several examples thereof.

Figure 3:
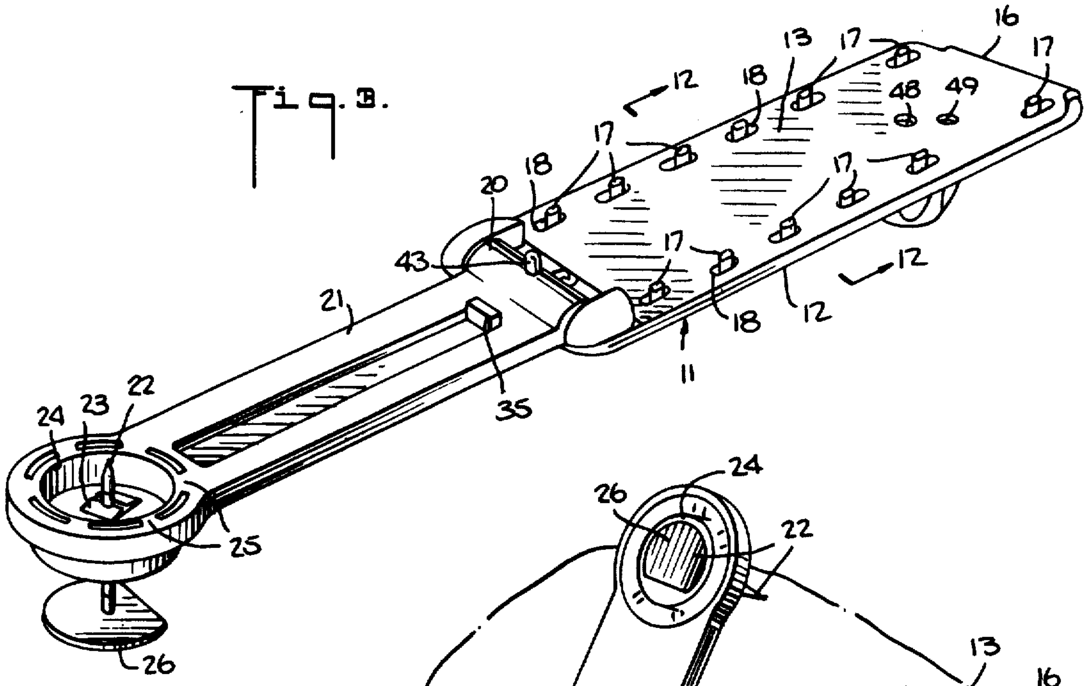
FIG. 3 is a perspective view of the tag showing the same after a further step in the assembly.
Figure 13:
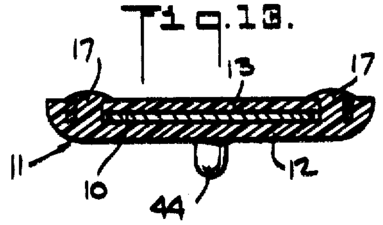
FIG. 13 is a view similar to FIG. 12 after the studs are hot-formed to produce heads thereon.
Figures 9, 10, 11:
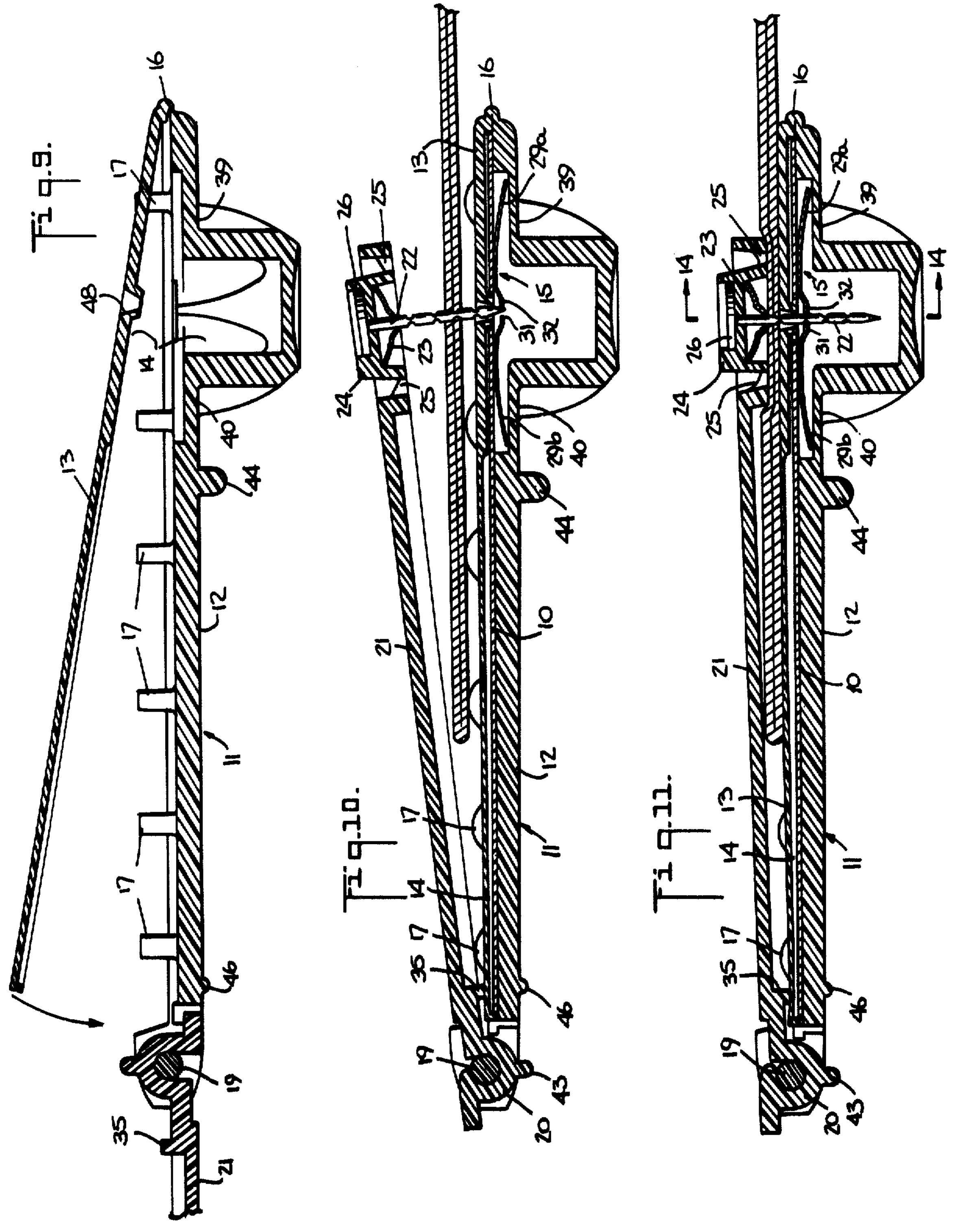
FIG. 9 is a longitudinal sectional view through the housing portion of the tag.
FIG. 10 is a longitudinal sectional view taken along line 10—10 of FIG. 5 but showing the tag only partially applied to the garment.
FIG. 11 is a view similar to FIG. 10 but with the tag fully applied to the garment.

The enclosure for the lock means, to be described in detail hereinafter, as well as the means for concealing the detectable element, comprises a common housing 11 formed of plastic material. The housing 11 has first and second mating parts 12 and 13, respectively, which when united provide a cavity 14 within to receive both the lock means 15 and the detectable element 10. As best seen in FIg. 9 of the drawings, the mating parts 12 and 13 of the housing are joined at 16 by a thin web or membrane forming a hinge. During assembly, after inserting the detectable element 10 and the lock means 15 in the corresponding sections of cavity 14, (see FIG. 2), the mating part 13 is folded over upon the part 12 such that the plurality of studs 17 in the part 12 pass through the slotted apertures 18 in the part 13, (see FIG. 3), whereupon the studs 17 are upended or hot-formed to produce a head thereon preventing withdrawal from said apertures 18, (see FIGS. 4 and 13).

Figure 4:
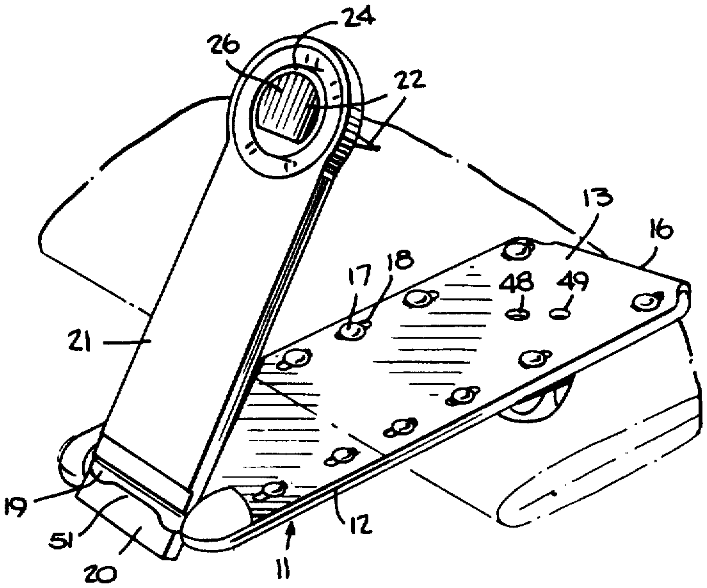
FIG. 4 shows a tag about to be secured to the edge of a garment.
Figure 5:
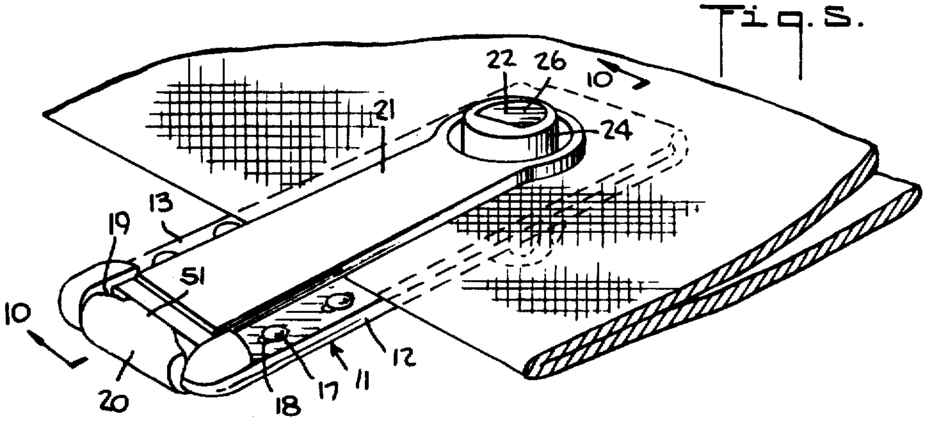
FIG. 5 is a view showing the tag completely secured to the garment.
Figure 6:
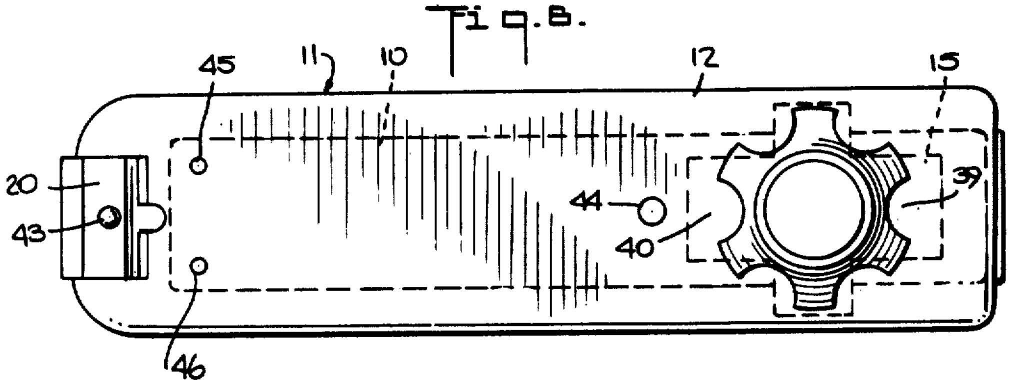
FIG. 6 is a top plan view of the tag.

The part 12 of th housing has a pintle 19 at one end positioned remotely from the end enclosing the lock means 15. This is best seen in FIGS. 4 and 9. Said pintle 19 receives the end 20 of a plastic lever 21 whose opposite end has secured thereto a pin 22 by means of retaining member 23.

Figures 1, 2:
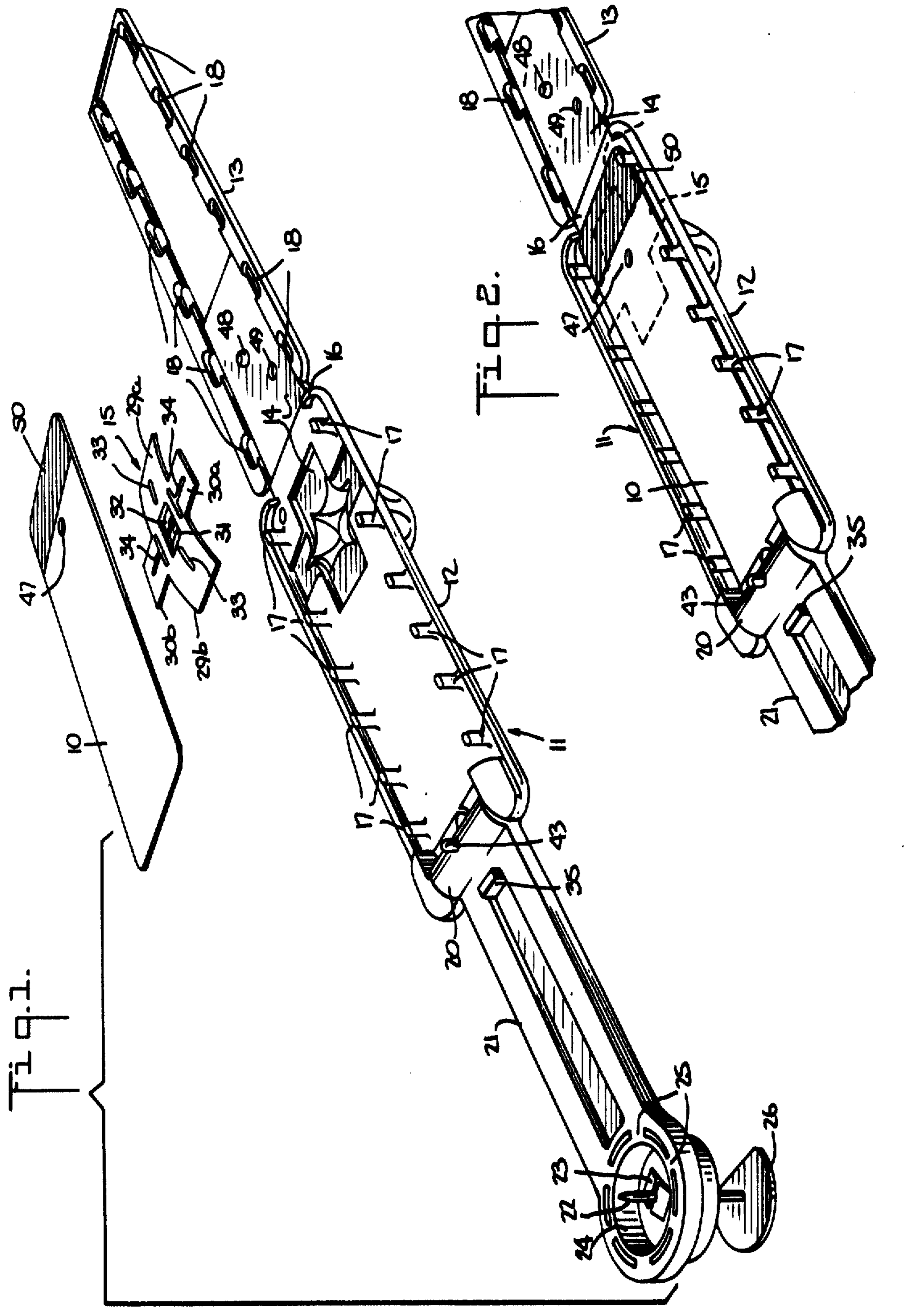
FIG. 1 is an exploded perspective view of a reusable tag embodying the subject invention and showing the component parts thereof.
FIG. 2 is a fragmentary view similar to FIG. 1 showing the tag partially assembled.
Figure 7:
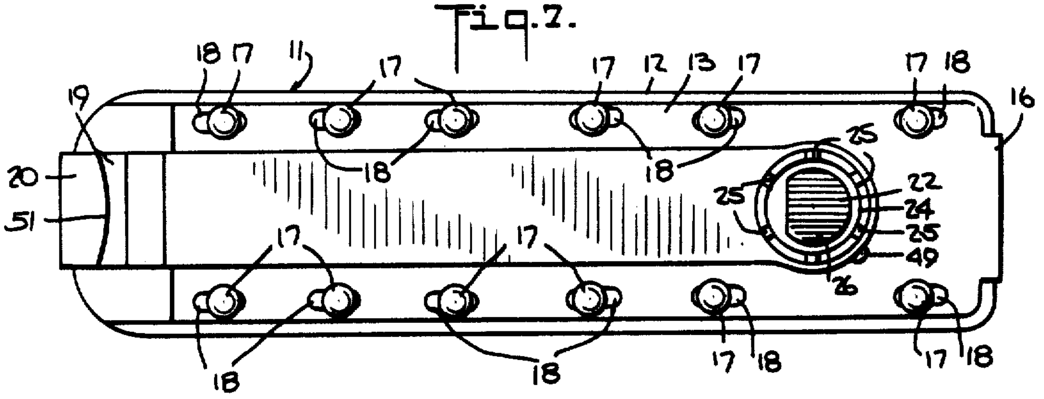
FIG. 7 is a bottom plan view of the tag.

Referring particularly to FIGS. 1, 7 and 10, it will be seen that the lever 21 has at its free end a zone 24 separated from the remainder of said lever 21 by frangible means in the form of the very thin radial spokes 25. Said pin 22 is joined to said zone 24 by passing therethrough, and the head 26 of said pin is keyed to aid zone 24 by having a noncircular configuration as shown, for example, in FIG. 7. Such keying of the pin to the zone 24 prevents rotation of the pin with respect thereto for a reason that will be apparent hereinafter.

Now referring to FIGS. 15 and 16, it will be observed that the pin 22 has a shank 27 joining its ends which is formed with a plurality of axially spaced annular grooves 28 having elliptical cross sections in planes normal to the pin axis and with the major axes of said grooves lying in a common plane. The grooves 28 provide a roughened surface to the pin for cooperation with the lock means as will be better understood hereinafter. This is accomplished due to the elliptical configuration at minimal sacrifice of tensile strength in the shank .7 so as to afford maximum resistance to unauthorized withdrawal of the pin from the lock means.

Figure 8:
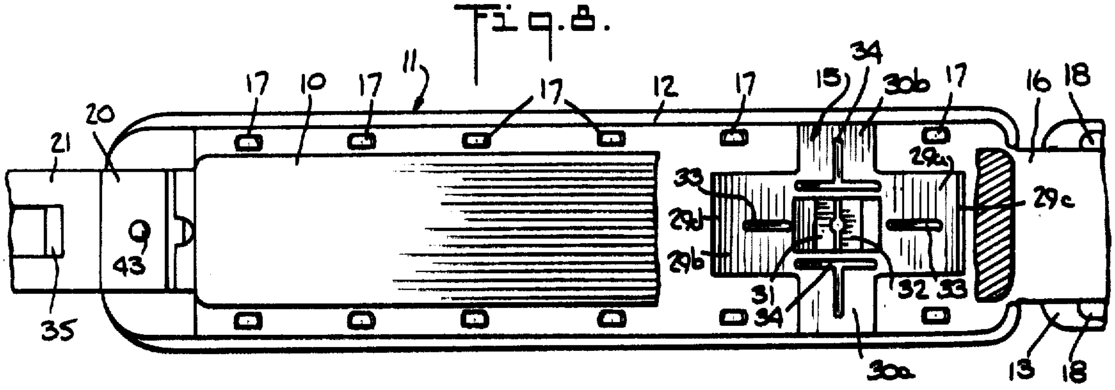
FIG. 8 is a top plan view of the tag partially assembled showing certain details of construction.
Figure 12:
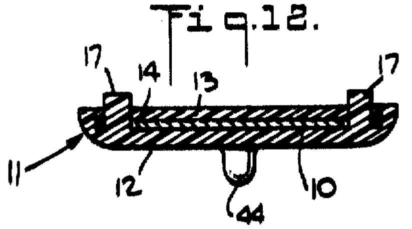
FIG. 12 is a transverse sectional view taken along line 12—12 of FIG. 3.

Referring now particularly to FIGS. 1, 8 and 17, it will be seen that the clutch lock means 15 comprise a cruciate member with one pair of arms 29*a* and 29*b* at right angle to another pair of arms 30*a* and 30*b* and formed from spring sheet metal with opposing jaws 31 and 32 raised on one side thereof from its central region. The longitudinal axes of said jaws 31 and 32 are parallel to the axis of said one pair of arms 29*a* and 29*b* and arranged such that manipulation of said pairs of arms respectively in opposite directions in one direction will cause separation of said jaws 31 and 32. From FIG. 17, it will be seen that the entire cruciate member 15 is cylindrically curved with the concave side being on the same side as the opposing jaws 31 and 32. The jaws 31 and 32 are sprung apart when the arms 29*a* and 29*b*are urged in a direction toward the convex side of the member, while the arms 30*a* and 30*b* are urged in the opposite direction. Ribs 33 and 34 are provided to prevent flexure of said arms other than immediately adjacent said jaws 31 and 32 such that any flexing force applied to said arms is communicated directly to said jaws. The edges of the jaws are circularly notched, as best seen in FIG. 16, to cooperate with the grooves 28 in the shank of the pin 22.

It now should be readily apparent that the manner of hinging the lever 21 to the housing 11 is such that the pin 22 is constrained for movement along a path intersecting the lock means 15. See FIGS. 4, 10 and 11. A slightly raised stop 35 on the lever 21 near the hinge 20 encounters the housing part 13 to resist inadvertent insertion of the pin 22 into the lock means. See FIG. 10. However, the flexibility of the lever 21 and housing section 13 is such as to permit easy insertion of the pin into the lock means when slight manual effort is applied thereto. It should also be readily apparent that the subject tag can easily be affixed to a garment with one hand.

Once the pin is inserted in the lock means, it preferably should require a pull in excess of 200 lbs. to separate the pin 22 from the lock means 15 in the absence of the application of a special tool thereto for releasing the same. If an attempt is made to withdraw the pin by applying prying force to the lever 21 the frangible spokes 25 will give way freeing the zone 24 along with the head 26 of the pin 22 from the lever. It will be understood that such action will fail to release the tag from a garment to which it is secured.

Referring now to FIG. 18, there is shown the essential components of and unlatching tool 36 for the subject security tag. Only the operative elements of the tool are shown since the mechanism for manipulating the same may take many obvious forms. In particular, such mechanism may either be hand operable or machine operable. Specifically, said unlatching tool comprises a pair of confronting jaws 37*a* and 37*b* having inwardly directed lips for embracing the housing 11 of the tag adjacent the ends of one pair of arms 30*l* and 30*b* of the lock means 15. The tool further includes a pair of spaced apart fingers 38*a* and 38*b* mounted for oppositional movement relative to the confronting jaws 37*a* and 37*b* for engaging the housing 11 at 39 and 40 to effect deformation thereof adjacent the other pair of arms 29*a* and 29*b* of said lock means sufficient to cause manipulation of said arms to release said lock means. See particularly FIGS. 19, 20, 21, 22 and 27.

From the foregoing, it should be understood that the housing 11 for the tag should have a size, shape and rigidity relating to that of the lock means 15 such as to bar unassisted manual release of said lock means while communicating to said lock means sufficient force to effect releasing manipulation thereof upon the application to the housing of said unlatching tool 36.

Referring to FIG. 7, it will be seen that the studs 17 towards one end of the housing are located adjacent one end of the slotted apertures 18, while at the other end of the housing the studs engage the opposite ends of said slotted apertures. This arrangement is such as to minimize stress on said studs if unauthorized bending assault is had upon said housing. It is comtemplated that an attempt might be made to destroy said tag by repeated bending. The particular plastic from which the tag is formed, namely, high impact polypropylene or equivalent material is capable of resisting repeated bending without fracture. It will be recognized that upon bending a tendency will arise for the respective parts of the housing to move in shear relative to each other. The arrangement of slotted apertures relative to studs will accommodate such shearing motion without undue development of stress.

As an additional facility for use with such tags as described above, it may be desirable to provide means for attaching thereto a replaceable intelligence bearing element. Such element may take the form of an insert 41 containing price information or the like. Such element is secured to the main housing 11 of the tag by an overlying sleeve 42 which embraces the sides of the housing 11 and is secured against removal by a protruding stop 43 formed on the hinge 20 associated with the lever 21. The protrusion 43 on the hinge 20 of the lever 21 is so positioned that when the lever is swung back relative to the housing the protrusion 43 is retracted from the end of the sleeve 42 permitting removal thereof and replacement of the intelligence bearing element 41. See FIGS. 25 and 26. Thus when the entire tag is secured to a garment or the like the sleeve 42 and its underlying element 41 is similarly secured against removal. Movement of the sleeve 42 along the housing 11 away from the protrusion 43 is prevented by a protrusion 44 formed directly on the portion 12 of the housing. Slight protrusions 45 and 46 on the part 12 of the housing function to locate the intelligence bearing element.

It should now be readily apparent that the aperture 47 in detectable element 10 accomodates passage of pin 22. A raised portion 48 with an aperture therethrough on the inner surface of housing part 13 acts as a locater for the element 10 by entering aperture 47 while simultaneously providing a bushing for guiding entry of pin 22.

A further aperture 49 is provided in housing part 13 for a purpose that may not be so evident. However, where different types of detectable elemens 10 having different response characteristics are used they may be color coded for identification. For example, see the shaded area 50 in FIG. 1. When the tag is assembled the color coding will always be visible through aperture 49 as best seen in FIG. 7.

For purpose of manufacture, the lever 21 is formed separately from the housing 11. After the hinge 20 is assembled to the pintle 19 the hinge may be heat deformed at 51 to prevent disassembly.

Referring now to FIGS. 1 and 8, it should be observed that the cavity formed in housing part 12 for receiving the lock means 15 is proportioned to afford clearance at the ends 29c and 29d of arms 29a and 29b, respectively, while surrounding the arms 30a and 30b with a reasonably close fit. Said clearance at ends 29c and 29d accommodates outward movement of arms 29a and 29b as the lock means 15 is flattened during an unlocking manipulation. However, the close fit between the housing part 12 and arms 30a and 30b functions to center the lock means such that the opening in jaws 31 and 32 is maintained in proper registration for receiving pin 22.

From the foregoing it should be apparent that arms 30a and 30b may be shortened or truncated retaining only sufficient projection to afford said centering action for the lock means 15. In such case, however, the housing part 13 will require reinforcing sufficient to communicate releasing force to the lock means 15 from the jaws 37a and 37b of the unlatching tool 36.

Having described a presently preferred embodiment of the invention it will be understood that various changes may be made in the details of construction thereof without departing from the true spirit of the invention as defined in the appended claims.

What is claimed is:

1. An unlatching tool for a reusable security tag of generally flat rectangular configuration with opposite broad surfaces extending between substantially parallel side edges, comprising in operationally interconnected relationship a pair of confronting jaws spaced apart and arranged to straddle said tag with a close fit alongside said side edges, each jaw having a portion for disposition alongside a corresponding side edge and an inwardly directed lip projecting toward the other jaw but not connected thereto for overlying and engaging a given one of the broad surfaces of said tag to prevent movement of said tag from between said jaws in a direction past said lips, and a pair of spaced apart fingers mounted for oppositional movement relative to the lips of said jaws for engaging the other broad surface of said tag to apply pressure to said tag against the restraint of said jaw lips, said fingers being located in a plane passing between said jaws so as to engage said tag to points on a line which is spaced from and substantially parallel to said portions of said jaws.

* * * * *